United States Patent
Nikamoto et al.

(10) Patent No.: US 8,117,749 B2
(45) Date of Patent: Feb. 21, 2012

(54) PROCESS FOR PRODUCING METALLIC GASKET

(75) Inventors: Hiroyuki Nikamoto, Fujisawa (JP);
Naoki Matsumoto, Fujisawa (JP);
Toshihiro Higashira, Fujisawa (JP);
Namieki Oosawa, Kikugawa (JP);
Tomonori Funatsu, Kikugawa (JP)

(73) Assignees: NOK Corporation, Tokyo (JP); Ishino Gasket Mfg., Co., Ltd., Tokyo (JP)

( * ) Notice: Subject to any disclaimer, the term of this patent is extended or adjusted under 35 U.S.C. 154(b) by 1066 days.

(21) Appl. No.: 11/989,144

(22) PCT Filed: Jul. 19, 2006

(86) PCT No.: PCT/JP2006/314222
§ 371 (c)(1),
(2), (4) Date: Jan. 22, 2008

(87) PCT Pub. No.: WO2007/010914
PCT Pub. Date: Jan. 25, 2007

(65) Prior Publication Data
US 2009/0229106 A1    Sep. 17, 2009

(30) Foreign Application Priority Data
Jul. 21, 2005 (JP) .................................. 2005-210829

(51) Int. Cl.
*B21D 53/84* (2006.01)
(52) U.S. Cl. ........ 29/888.3; 277/592; 277/596; 101/129
(58) Field of Classification Search ..... 413/9; 29/888.3; 101/129, 128.4, 127; 277/596, 592
See application file for complete search history.

(56) References Cited

U.S. PATENT DOCUMENTS

| | | | | |
|---|---|---|---|---|
| 3,225,691 A | * | 12/1965 | Kehe et al. | 101/127 |
| 2003/0075874 A1 | * | 4/2003 | Inamura et al. | 277/593 |
| 2004/0130102 A1 | * | 7/2004 | Ueta et al. | 277/593 |

FOREIGN PATENT DOCUMENTS

| | | |
|---|---|---|
| JP | 04-083976 | 3/1992 |
| JP | 2002-054745 | 2/2002 |
| JP | 2002-228001 | 8/2002 |
| JP | 2003-056706 | 2/2003 |
| JP | 2003-130225 | 5/2003 |

* cited by examiner

*Primary Examiner* — David Bryant
*Assistant Examiner* — Jacob Cigna
(74) *Attorney, Agent, or Firm* — Brinks Hofer Gilson & Lione

(57) ABSTRACT

A process for producing a metallic gasket, which comprises making a thin metallic sheet into a solid figure having an inclined surface, thereby providing a bead region extended upwardly and downwardly over the inclined surface, and forming a sealing part made of a hardened rubber layer on the surface of bead region, characterized by forming a sealing part extended from the apex of the bead region down to an upperward position on the inclined surface, and another sealing part extended from a downward position on the inclined surface down to the flat bottom part, and joining the sealing parts by the rubber material in a solution state extended along the inclined surface from both of the sealing parts, before drying and hardening of the material for making sealing parts. Application of the rubber material in a solution state is carried out preferably by a screen printing process. The rubber sealing parts formed by a silk screen printing process contributes to uniformization of the layer thickness resulting from the drying and hardening.

8 Claims, 4 Drawing Sheets

[Fig.1]
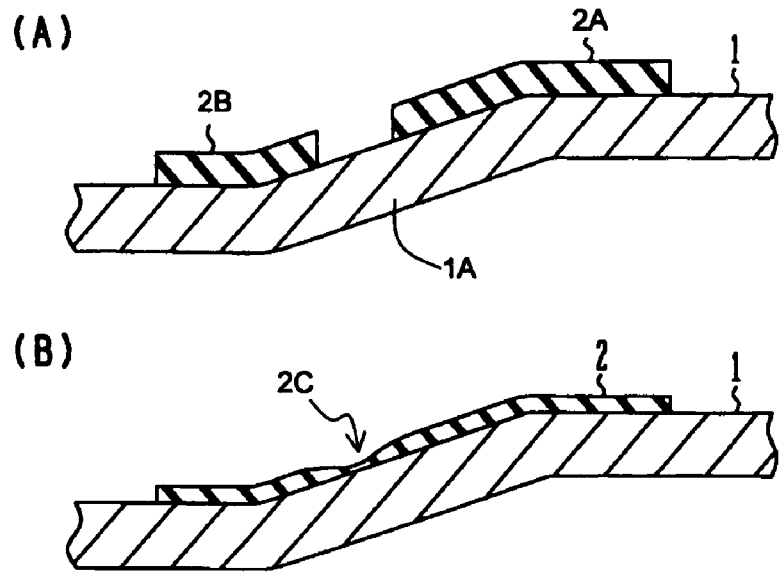
[Fig.2]
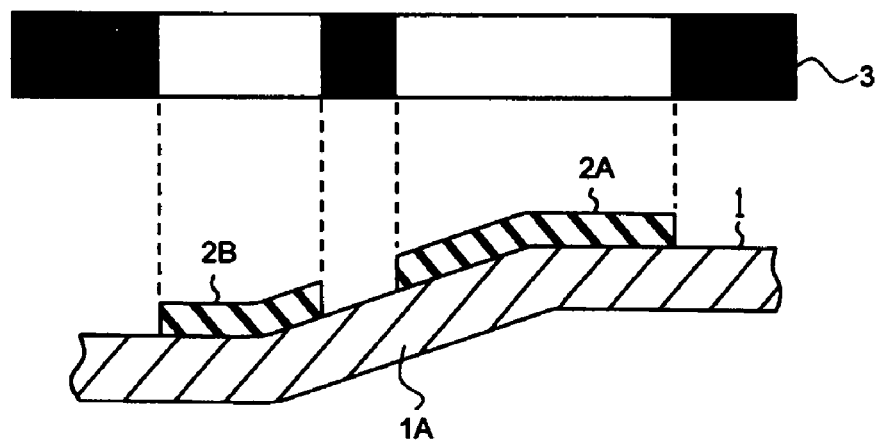

[Fig.3]
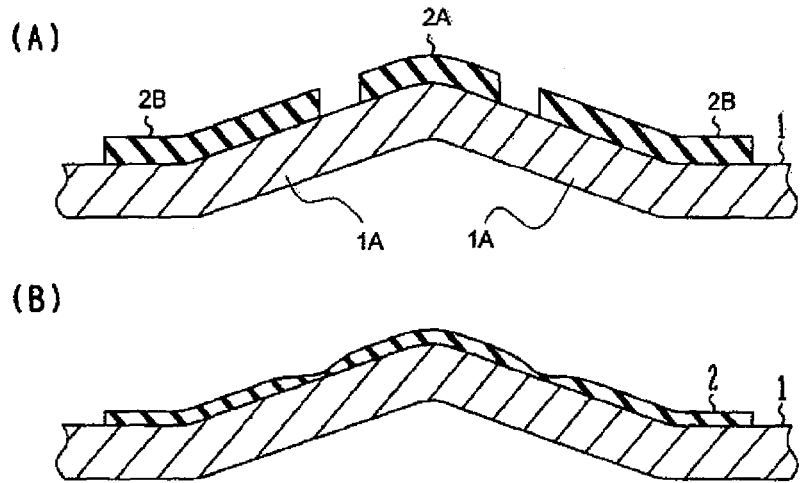
[Fig.4]
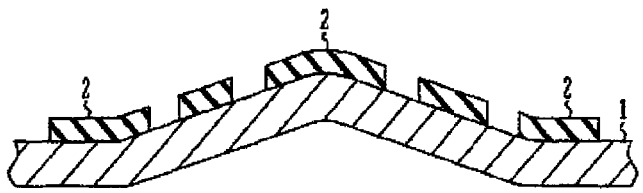
[Fig.5]
(Prior Art)
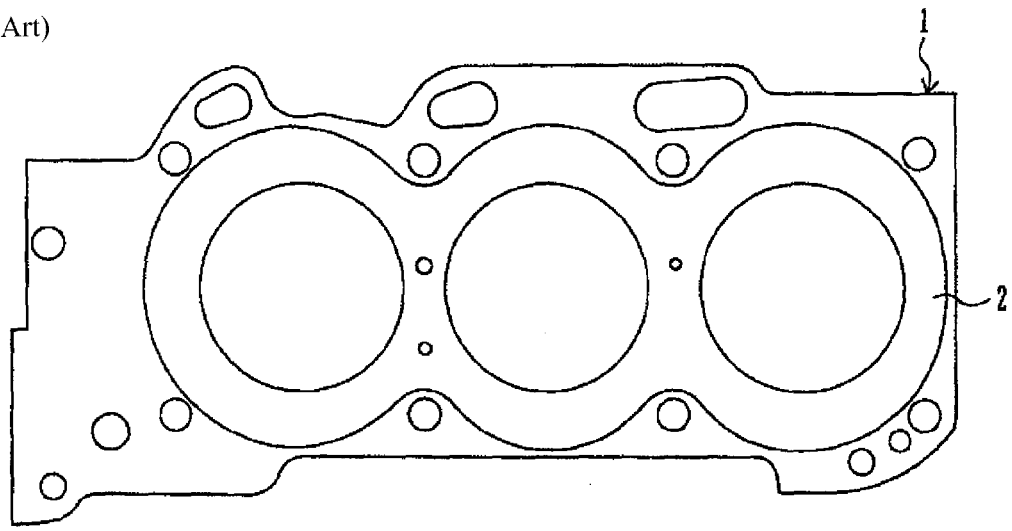

[Fig.6]
(Prior Art)
(A)
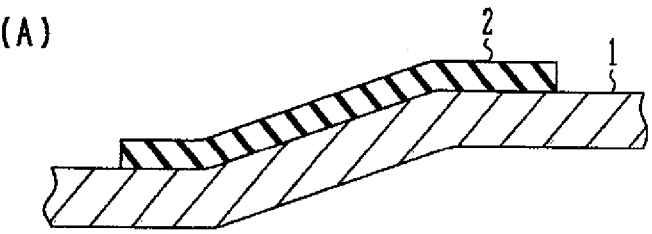
(B)
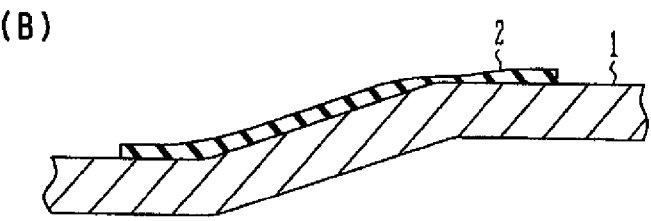
[Fig.7]
(Prior Art)
(A)
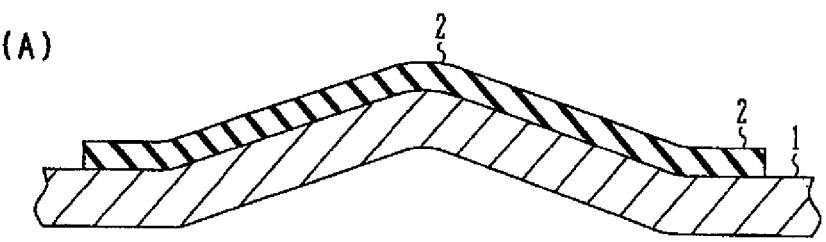
(B)
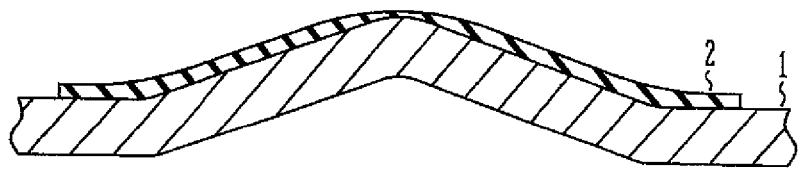

[Fig.8]
(Prior Art)
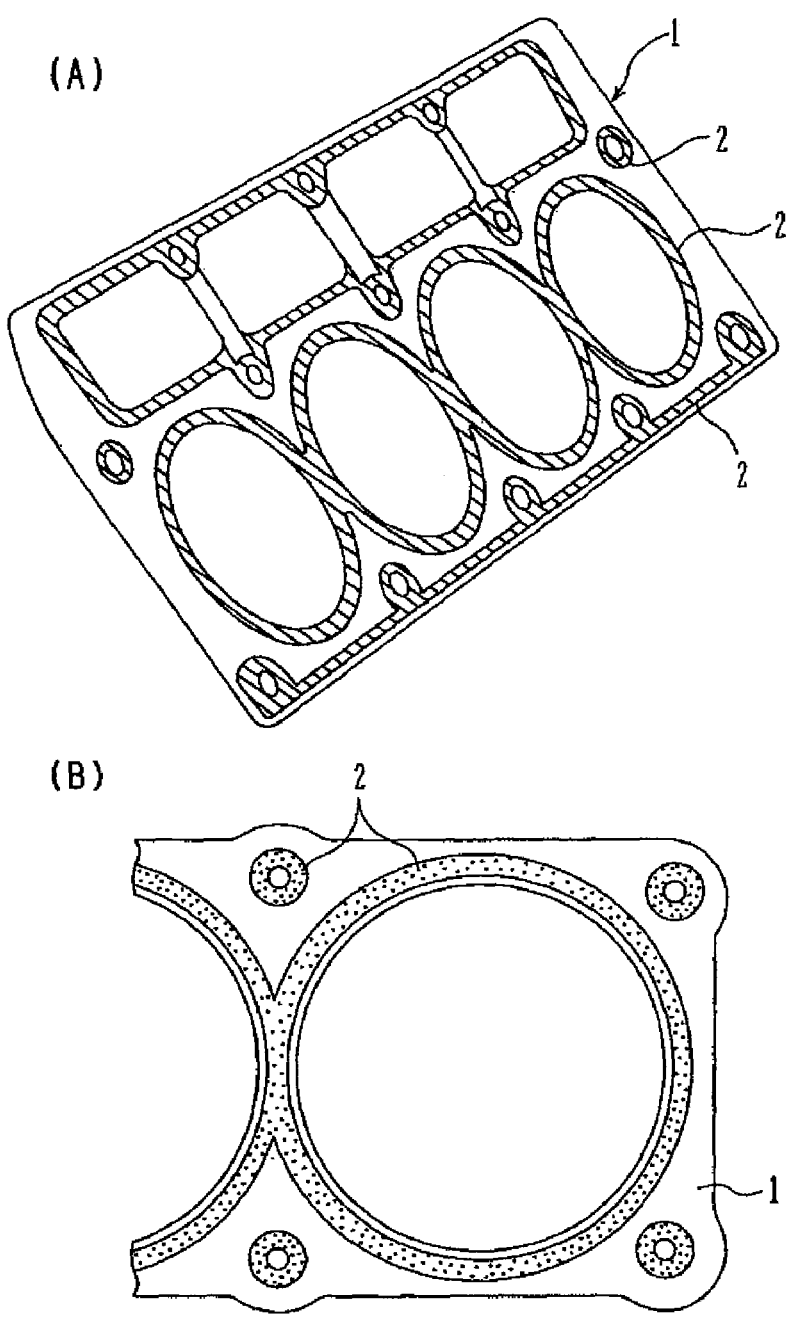

PROCESS FOR PRODUCING METALLIC GASKET

RELATED APPLICATIONS

The present application is a 35 U.S.C. §371 national stage filing of International Patent Application No. PCT/JP2006/314222, filed Jul. 19, 2006, to which priority is claimed under 35 U.S.C. §120 and through which priority is claimed under 35 U.S.C. §119 to Japanese Priority Patent Application No. 2005-210829, filed Jul. 21, 2005.

TECHNICAL FIELD

The present invention relates to a process for producing a metallic gasket provided a seal structure, particularly a metallic gasket provided with sealing parts thereon by a silk screen printing process.

BACKGROUND ART

The so far well known gasket such as cylinder head gaskets, etc., as shown in FIG. 5, comprise a thin metallic sheet 1 and a sealing part 2 provided along peripheral edges of openings, etc. formed at appropriate positions of thin metallic sheet 1 (for example, see Patent Literature 1). Sealing part 2 is provided in a gently sloped region of crank-shaped cross-section (also called a stepped or half-bead region) as shown e.g. in FIG. 6(A), or in a bead region of chevron-shaped cross-section (also called a full-bead region) as shown in FIG. 7(A).
Patent Literature 1: JP-A-2002-228001

Sealing part 2 is made of a thin rubber layer, where the more uniform the thickness of the rubber layer is the more preferable. The flat thin metallic sheet provided with a rubber layer thereon by baking in advance is bent at appropriate positions of thin metallic sheet 1 to form bead regions, thereby making a desired cylinder head gasket (precoat process). The precoat process requiring such a bending step as a post-treatment can make the rubber thickness of sealing part 2 approximately uniform, but requires a large investment for the production facility, and furthermore the recycling of the waste resulting from the production of metallic gaskets is quite troublesome, and also the formation of rubber layer at other positions than that of sealing part 2 gives a new problem of the rising of material cost.

It is also known, as shown in FIGS. 8(A) and (B), to apply sealing part 2 made of rubber material of low viscosity or in a melt state or a solution state by a silk screen printing process, a pad printing process, a roll coater printing process, etc. by a plurality of runs to the surface of thin metallic sheet 1 as formed in a cylinder head shape to form a rubber layer, while adjusting the width and height of seal to desired ones, followed by drying and heat hardening, thereby forming sealing part 2 of desired cross-sectional shape on the surface of thin metallic sheet 1 (aftercoat process see the afore-mentioned Patent Literature 1).

DISCLOSURE OF THE INVENTION

Problem to be Solved by the Invention

When sealing part 2 is formed on the gently inclined crank-shaped cross-section, as shown in FIG. 6(A), or on the bead region of chevron-shaped cross-section, as shown in FIG. 7(A), in the seal structure of a metallic gasket as formed by the above-mentioned aftercoat process, the rubber layer is formed of a rubber ink in a molten state or in a solution state, and thus in the case of the gently inclined bead region of crank-shaped cross-section as shown in FIG. 6(A), the rubber ink at the upper bent area (apex) will flow downwards along the inclined surface, whereby the dried and hardened rubber layer in the apex area of the sealing part 2 becomes thinner than the rubber layer in the upper flat bead region, as shown in FIG. 6(B). Since the rubber ink flows downwards from the upper bent area (apex), the dried and hardened rubber layer in the lower flat region of rubber part 2 becomes thicker than the rubber layer in the upper flat region.

In the case of the bead region of chevron-shaped cross-section, as shown in FIG. 7(A), the rubber ink likewise flows downwards along inclined surfaces in two directions from the apex (ridge line), whereby the dried and hardened rubber layer in the apex area of rubber part 2 becomes thinner than the rubber layer in the lower flat region, as shown in FIG. 7(B).

The resulting thinner rubber layer area is positioned at a seal surface pressure-generating site, and thus has a problem of lowering the absorbability of surface roughness of the mate member. Furthermore, the resulting thicker rubber layer has a problem of lowering the necessary surface pressure for the sealing part due to the generation of such a high surface pressure.

In the case of such a printing process hard to obtain a rubber layer in a uniform thickness, there is such a problem that the rubber layer fails to have a desired thickness by a single run of printing, as disclosed in Patent Literature 1.

An object of the present invention is to solve the foregoing problems and provide a process for producing a metal gasket contributable of forming a hardened rubber layer of uniform thickness by printing process.

Means for Solving the Problems

According to the present invention as described in claim 1, the object of the present invention can be attained by a process for producing a metallic gasket, which comprises making a thin metallic sheet into a solid figure having an inclined surface, thereby providing a bead region extended upwardly and downwardly over the inclined surface, and forming a sealing part made of a hardened rubber layer on the surface of bead region, characterized by forming a sealing part extended from the apex of the bead region down to an upperward position on the inclined surface, and another sealing part extended from a downward position on the inclined surface down to the flat bottom part, and joining the sealing parts by the rubber material in a solution state extended along the inclined surface from both of the sealing parts, before drying and hardening of the material for making sealing parts.

According to another aspect of the present invention as described in Claim 2, the object of the present invention can be attained by a process for producing a metallic gasket, which comprises applying a rubber material in a solution state by a screen printing process to the surface of a bead region extended upwardly and downwardly over the inclined surface of a thin metallic sheet made in a solid figure, and drying and hardening the rubber material in a solution state, thereby forming a sealing part made of dried and hardened rubber layer, characterized by application of the rubber material in a solution state interrupting at an intermediate position on the inclined surface with an emulsion on a screen printing plate, thereby forming an application-interrupted zone on the inclined surface, and removing the screen printing plate, thereby allowing the rubber material in a solution state to flow down into the application-interrupted zone from the upper side of the inclined surface, and to join with the rubber material in a solution state printed at the lower side of the inclined surface, followed by drying and hardening.

The sealing part formed according to the present process for producing a metallic gasket is characterized in that the rubber material in a solution state has a solid matter concentration of 5-60 wt. %, and a viscosity (at room temperature) of 100-100,000 cps.

The sealing part formed according to the present process for producing a metallic gasket is characterized in that the mask for interrupting the rubber material in a solution state at the intermediate position on the inclined surface has a width of 0.2-2.0 mm.

The sealing part formed according to the present process for producing a metallic gasket is characterized in that the rubber material in a solution state extended from the apex of the bead region down to the intermediate position on the inclined surface has a printing width of 0.1-4.0 mm.

The sealing part formed according to the present process for producing a metallic gasket is characterized in that the rubber material in a solution state has a printed film thickness of 10-500 μm.

The sealing part formed according to the present process for producing a metallic gasket is characterized in that the bead region over the inclined surface has a level difference of 0.05-0.5 mm. Such a level difference is preferable as a level difference enabling an easy press bending of a thin sheet.

The sealing part formed according to the present process for producing a metallic gasket is characterized in that the application-interrupted zone is in a slit form.

The sealing part formed according to the present process for producing a metallic gasket is characterized in that the application-interrupted zone is in a dimple form (not limited to a circular form, but including a rectangular form, a square form, etc.).

Effect of the Invention

According to the present process for producing a metallic gasket, one sealing part extended from the apex of bead region down to an upper downward position on the inclined surface and another sealing part extended from a lower downward position on the inclined surface down to the flat bottom are joined together by a rubber material in a solution state extended along the inclined surface before drying and hardening of the solution for both of the sealing parts, thereby making the rubber layer uniform in the thickness after drying and hardening of the rubber parts formed by a screen printing process.

That is, in the case of the sealing part (apex area of bead region) extended from the apex of the bead region down to the upper downward position on the inclined surface, the rubber material in a solution state flows downwards along the inclined surface, and due to a lower surface tension of the ink, the ink in other areas than the inclined surface can extend outwards, while in the case of the sealing part (bottom area of bead region) extended from the lower downward position of the inclined surface down to the flat bottom area, the ink can extend (flow) due to a lower surface tension of the ink, whereby the ink flowing from the apex of the bead region is allowed to join with the ink extended on the bottom area of the bead region before drying and hardening of the applied ink to make the rubber film uniform in the thickness.

BRIEF DESCRIPTION OF DRAWINGS

FIG. 1 shows one embodiment of a seal structure of crank shaped cross-section of the present metallic gasket, where (A) is a cross-sectional view of the essential part before hardening a rubber material in a solution state, and (B) is a cross-sectional view of the essential part after hardening of the rubber material in a solution state.

FIG. 2 is an explanatory view showing the stepwise course of a process for producing the present metallic gasket.

FIG. 3 is one embodiment of a sealing part structure of chevron-shaped cross-section of a metallic gasket, where (A) is a cross-sectional view of the essential part before hardening of a rubber material in a solution state, and (B) is a cross-sectional view of the essential part after hardening of the rubber material in a solution state.

FIG. 4 is a cross-sectional view of the essential part before hardening of a rubber material in a solution state in another embodiment of a sealing part structure of chevron-shaped cross-section of the present metallic gasket.

FIG. 5 is a front view of the conventional metallic gasket.

FIG. 6 shows one embodiment of a sealing part structure of the conventional metallic gasket, where (A) is a cross-sectional view of the essential part before hardening of a rubber material in a solution state, and (B) is a cross-sectional view of the essential part after hardening of the rubber material in a solution state.

FIG. 7 shows another embodiment of a sealing part structure of the conventional metallic gasket, where (A) is a cross-sectional view of the essential part before hardening of a rubber material in a solution state, and (B) is a cross-sectional view of the essential part after hardening of the rubber material in a solution state.

FIG. 8 (A) is a perspective view of a metallic gasket, and (B) is a front view of the essential part of the metallic gasket.

DESCRIPTION OF REFERENCE NUMERALS

1 Thin metallic sheet
1A Inclined surface
2 Sealing part (rubber part)
2A Apex area of bead region
2B Bottom area of bead region
2C Joint

BEST MODES FOR CARRYING OUT THE INVENTION

The present process for producing a metallic gasket will be described below, referring to drawings.

In FIG. 1, numeral 1 is a thin metallic sheet, and 2 is a sealing part (rubber part). Rubber part 2 is a meshwise print (coating) of a rubber material in a solution state by a silk screen printing process, using a screen plate 3, as shown in FIG. 2, and the rubber material is coated to the inclined surface 1A of thin metallic sheet 1 with an application-interrupted zone at an intermediate position (i.e. an apex area 2A of the bead region extended down to the upper downward position on the inclined surface 1A and a bottom area 2B of the bead region extended over the lower downward surface of inclined surface 1A) before drying and hardening of the applied ink. The application-interrupted zone free from the rubber material in a solution state has a width corresponding to the width of an emulsion on the silk screen plate. A metal mask printing process can be also used in place of the silk screen printing process.

For example, in the apex area 2A of the bead region extended over the apex, the print width is 2 mm, whereas in the bottom area 2B of the bead region, the print width is 1.4 mm. In these embodiments, the application-interrupted zone (clearance) free from the rubber material in a solution state between the apex area 2A of the bead region and the bottom area 2B of the bead region has a width of 0.6 mm. The width of the application-interrupted zone is preferably in a range of 0.4-0.8 mm. When the width of the application-interrupted zone is not more than 0.4 mm, joint 2C (as shown in FIG. 1(B)) of rubber part 2 will not stand out, but there is a problem of deterioration in the durability of silk screen emulsion corresponding to the joint part, whereas when the width of the application-interrupted zone is over 0.8 mm, the rubber material in a solution state in the apex area 2A of the bead region at the upper side fails to fill the application-interrupted zone to the full width (i.e. fails to join with the rubber material in the bottom area 2B of the bead region) even if the rubber material flows down along the inclined surface into the application-interrupted zone. Generally, the width of the application-interrupted zone depends on the kind of rubber ink, and dimension and shape of rubber print part, and thus can be set to approximately 0.2-2 mm, preferably 0.4-1.6 mm.

In the case of chevron-shaped cross-section in another embodiment, as shown in FIG. 3(A), the print width for the apex area 2A of the bead region extended over the apex is 2 mm, whereas that for the bottom area 2B of the bead region is 4 mm. The width of the application-interrupted zone (clearance) of the rubber material in a solution state between the apex area 2A on the bead region and the bottom area 2B on the bead region is 0.4 mm. That is, in FIG. 1(A), the rubber material in a solution flows down only in one direction, whereas in FIG. 3(A), the rubber material flows down in two directions from the apex as a divide, so the width of the application-interrupted zone is made shorter, and is preferably in a range of 0.3-0.6 mm in this case. As already mentioned above, the width of the application-interrupted zone generally depends on the kind of rubber ink, and dimension and shape of rubber print part, and is set to approximately 0.2-2.0 mm, preferably 0.3-1.2 mm. The lower limit value of the width of the application-interrupted zone can be selected in view of durability of the emulsion, and uniformess of film thickness at the tip end of the bead region.

The present process for producing a metallic gasket in the afore-mentioned structure can be carried out in one embodiment by:

(1) A thin metallic sheet 1 having a thickness of preferably about 0.05 to about 0.3 mm, followed by forming after punching of SUS plate to obtain a gasket shape having an appearance as described before in Section "Background Art", where the bead region is formed in a solid figure to ensure the sealability (tightness to the mate member, and elasticity) of sealing part 2.

(2) Washing the formed thin metallic sheet 1, and apply an adhesive to the surface thereof, followed by drying and baking of the adhesive, and printing a rubber ink (rubber material in a solution state) to the surface in the desired area of the thin metallic plate by a silk screen printing process, where an adhesive-containing rubber ink can be used in place of both use of the adhesive and the rubber ink.

(3) Whereby the rubber material in a solution state can be printed meshwise with an application-interrupted zone at an intermediate position on the inclined surface 1A by a mask as mentioned above.

(4) Air drying the printed rubber in a solution state is carried out to a non-sticky state, and turn the thin metallic sheet 1 over and apply the rubber material in a solution state to the turned-over side in the same manner as above (not shown in the drawings).

Rubber material for use herein includes, ordinary rubber materials such as fluororubber, (hydrogenated) nitrile rubber, etc. Rubber material in a solution state contains a solvent such as an organic solvent, etc., and has a solid matter concentration of 5-60% by weight, preferably 10-40% by weight (30% by weight in the present example), and a viscosity (at room temperature) of 100-100,000 cps, preferably 1,000-50,000 cps (250 cps in the present example).

Width of the application-interrupted zone free from the rubber material in a solution state at an intermediate position on the inclined surface 1A is 0.2-2.0 mm, and a preferable range of the application-interrupted zone depends also on a difference in half-bead region or a full-bead region, and, for example, 0.4-1.6 mm for the half-bead region, and 0.3-1.2 mm, more preferably 0.3-0.6 mm for the full-bead region;

The print width of the apex area 2A of the bead region is 0.1-4.0 mm, preferably 0.2-2.0 mm. Film thickness of printed rubber material in a solution state is 10-500 μm, preferably 10-100 μm. The print width and film thickness can be selected in view of a level difference between the apex area 2A of the bead region and the bottom area 2B of the bead region over the inclined surface (e.g. 0.05-0.5 mm, preferably 0.1-0.2 mm), angle of inclination of the inclined surface, setting of film thickness after drying and hardening, etc.

The application-interrupted zone is in a slit form, but can be in a discrete dimple form.

(5) When drying and hardening the rubber material in a solution in that sate, by removing the screen plate 3 the rubber material in a solution state flow down into the application-interrupted zone from the upper side and drying and hardening the rubber material in a solution in joining state with each other, thereby forming a joining part at the application-interrupted zone and forming sealing parts 2 having substantially uniform thickness is formed, as shown in FIG. 1(B) and FIG. 3(B).

In above examples of the present invention, an adhesive-containing rubber ink having a solid matter concentration of 30 wt. %, and a viscosity (at room temperature) of 250 cps was screen printed, and then the screen plate 3 was removed to flow down the rubber material in a solution state on the upper side of the inclined surface 1A into an application-interrupted zone and to join the printed rubber material in a solution sate on the lower side of the inclined surface 1A, followed by oven vulcanization at 200° C., whereby in these examples a rubber part 2 having a layer thickness of 20-30 μm excluding the joint part is formed for the seal layer on the flat area having a target value of 25 μm.

In the foregoing embodiment, number of application-interrupted zone free from the rubber material in a solution, formed on the screen plate 3 is 1 in FIG. 1(A), and 2 in FIG. 3(A), but can be 3 or more (e.g. 4 as shown FIG. 4).

The invention claimed is:

1. A process for producing a metallic gasket, which comprises making a thin metallic sheet into a solid figure having an inclined surface, thereby providing a bead region extended upwardly and downwardly over the inclined surface, and forming a sealing part made of a hardened rubber layer on a surface of the bead region, and forming a first sealing part that extends from an apex of the bead region down to an upperward position on the inclined surface, and forming a second sealing part that extends from a downward position on the inclined surface down to a flat bottom part, there being an application-interrupted zone between the first and second sealing parts and joining the sealing parts by a rubber material in a solution state that extends along the inclined surface from both of the sealing parts by allowing the rubber material in a solution state to flow down into the application-interrupted zone from the upperward position on the inclined surface and to join with the rubber material in a solution state formed at the downward position on the inclined surface, before drying and hardening of the material for making sealing parts.

2. A process for producing a metallic gasket, which comprises applying a rubber material in a solution state by a screen printing process to a surface of a bead region that extends upwardly and downwardly over an inclined surface of a thin metallic sheet made in a solid figure, and drying and hardening the rubber material in a solution state, thereby forming a sealing part made of dried and hardened rubber layer, the rubber material being applied in a solution state and being interrupted at an intermediate position on the inclined surface with an emulsion on a screen printing plate, thereby forming an application-interrupted zone on the inclined surface, and removing the screen printing plate, thereby allowing the rubber material in a solution state to flow down into the application-interrupted zone from an upper side of the inclined surface, and to join with the rubber material in a solution state printed at a lower side of the inclined surface, followed by drying and hardening.

3. A process for producing a metallic gasket according to claim 2, wherein the application-interrupted zone is in a slit form.

4. A process for producing a metallic gasket according to claim 2, wherein the application-interrupted zone is in a dimple form.

5. A process for producing a metallic gasket according to claim 2, wherein a mask used for interrupting application of the rubber material in a solution state at the intermediate position on the inclined surface has a width of 0.2-2.0 mm.

6. A process for producing a metallic gasket according to claim 5, wherein the bead region comprises a half-bead region, and the mask used for interruption of the application has a width of 0.4-1.6 mm.

7. A process for producing a metallic gasket according to claim 5, wherein the bead region comprises a full-bead region, and the mask used for interruption of the application has a width of 0.3-1.2 mm.

8. A process for producing a metallic gasket according to claim 7, wherein the mask used for interruption of the application has a width of 0.3-0.6 mm.

* * * * *